US012752228B2

(12) United States Patent
Parikh et al.

(10) Patent No.: US 12,752,228 B2
(45) Date of Patent: Oct. 6, 2026

(54) SYSTEMS AND METHODS FOR ROTATING COALESCERS MAINTAINING POSITIVE RECIRCULATION THROUGH A DYNAMIC SEAL

(71) Applicant: Atmus Filtration IP, Inc., Nashville, TN (US)

(72) Inventors: Chirag D. Parikh, Madison, WI (US); Christopher E. Holm, Madison, WI (US); Peter K. Herman, Stoughton, WI (US); Arun P. Janakiraman, Stoughton, WI (US); Brian W. Schwandt, Fort Atkinson, WI (US)

(73) Assignee: Atmus Filtration IP, Inc., Nashville, TN (US)

(*) Notice: Subject to any disclaimer, the term of this patent is extended or adjusted under 35 U.S.C. 154(b) by 149 days.

(21) Appl. No.: 18/424,426

(22) Filed: Jan. 26, 2024

(65) Prior Publication Data

US 2024/0173661 A1 May 30, 2024

Related U.S. Application Data

(62) Division of application No. 15/580,481, filed as application No. PCT/US2016/036432 on Jun. 8, 2016, now Pat. No. 11,918,948.

(Continued)

(51) Int. Cl.

*B01D 45/00* (2006.01)
*B01D 45/12* (2006.01)

(Continued)

(52) U.S. Cl.

CPC ........... *B01D 46/003* (2013.01); *B01D 45/12* (2013.01); *B01D 45/14* (2013.01); *F01M 13/04* (2013.01);

(Continued)

(58) Field of Classification Search

CPC ...... B01D 46/003; B01D 45/12; B01D 45/14; B01D 2279/35; F01M 13/04; F01M 2013/0422; F01M 2013/0438

(Continued)

(56) References Cited

U.S. PATENT DOCUMENTS 2,788,125 A 4/1957 Edmond
2,905,327 A 9/1959 Phillps (Continued)

FOREIGN PATENT DOCUMENTS

CN 101491793 A 7/2009
CN 101784325 A 7/2010

(Continued)

OTHER PUBLICATIONS

Chinese Office Action from corresponding CN Application No. 2016800326319, dated Mar. 18, 2019, pp. 1-6.

(Continued)

*Primary Examiner* — T. Bennett Mckenzie

(74) *Attorney, Agent, or Firm* — Benesch Friedlander Coplan & Aronoff LLP

(57) ABSTRACT

Rotating coalescer crankcase ventilation (CV) systems are described. The described CV systems utilize a pumping pressure created by the porous media of the rotating coalescer to maintain positive recirculation of filtered blowby gases through a potential leak gap between a static housing inlet and a spinning component of the rotating coalescer. In some arrangements, the porous media is fibrous media. The filter media may be pleated or non-pleated. The positive recirculation caused by the pressure balance prevents unfiltered blowby gases from bypassing the media of the rotating coalescer from the upstream side to the downstream side of the filter media through the gap. During operation, the pressure balance between the upstream side (Continued)

and downstream side of the filter media maintains the positive recirculation, which in turn maintains a high filtration efficiency.

20 Claims, 4 Drawing Sheets

Related U.S. Application Data

(60) Provisional application No. 62/173,149, filed on Jun. 9, 2015.

(51) Int. Cl.
*B01D 45/14* (2006.01)
*B01D 46/00* (2022.01)
*F01M 13/04* (2006.01)

(52) U.S. Cl.
CPC .................... *B01D 2279/35* (2013.01); *F01M 2013/0422* (2013.01); *F01M 2013/0438* (2013.01)

(58) Field of Classification Search
USPC ............................................................ 55/400
See application file for complete search history.

(56) References Cited

U.S. PATENT DOCUMENTS

| | | | | |
|---|---|---|---|---|
| 2,937,755 | A | 5/1960 | Szwargulski | |
| 3,234,716 | A * | 2/1966 | Sevin | B04B 5/12 209/714 |
| 3,362,155 | A | 1/1968 | Driscoll | |
| 3,451,551 | A | 6/1969 | Sample et al. | |
| 3,531,897 | A | 10/1970 | Weimar | |
| 4,189,310 | A | 2/1980 | Hotta | |
| 4,279,630 | A | 7/1981 | Nakamura et al. | |
| 4,460,393 | A * | 7/1984 | Saget | B04B 5/12 209/714 |
| 4,482,365 | A | 11/1984 | Roach | |
| 4,487,618 | A | 12/1984 | Mann | |
| 4,502,956 | A | 3/1985 | Wilson et al. | |
| 4,514,193 | A | 4/1985 | Booth | |
| 4,516,994 | A | 5/1985 | Kocher | |
| 4,981,502 | A | 1/1991 | Gottschalk | |
| 5,056,935 | A | 10/1991 | Singh | |
| 5,401,706 | A | 3/1995 | Fischer | |
| 5,462,658 | A | 10/1995 | Sem | |
| 5,466,385 | A | 11/1995 | Rogers et al. | |
| 5,716,423 | A | 2/1998 | Krul et al. | |
| 5,863,317 | A | 1/1999 | Smith et al. | |
| 6,033,450 | A | 3/2000 | Krul et al. | |
| 6,123,061 | A | 9/2000 | Baker et al. | |
| 6,139,595 | A | 10/2000 | Herman et al. | |
| 6,183,407 | B1 | 2/2001 | Hallgren et al. | |
| 6,499,285 | B1 | 12/2002 | Snyder | |
| 6,517,612 | B1 | 2/2003 | Crouch et al. | |
| 6,640,792 | B2 | 11/2003 | Harvey et al. | |
| 6,652,439 | B2 | 11/2003 | Herman et al. | |
| 6,709,477 | B1 | 3/2004 | Haakansson et al. | |
| 6,713,112 | B1 * | 3/2004 | Lucas | B01D 50/40 55/423 |
| 6,876,760 | B1 | 4/2005 | Vaisberg et al. | |
| 7,235,177 | B2 | 6/2007 | Herman et al. | |
| 7,811,347 | B2 | 10/2010 | Carlsson et al. | |
| 7,824,458 | B2 | 11/2010 | Borgstrom et al. | |
| 7,824,459 | B2 | 11/2010 | Borgstrom et al. | |
| 8,172,917 | B2 | 5/2012 | Kup et al. | |
| 8,231,752 | B2 | 7/2012 | Janikowski et al. | |
| 8,268,033 | B2 | 9/2012 | Rogers et al. | |
| 8,794,222 | B2 | 8/2014 | Schwandt et al. | |
| 8,974,567 | B2 | 3/2015 | Verdegan et al. | |
| 10,927,730 | B2 | 2/2021 | Barreteau et al. | |
| 11,156,137 | B2 | 10/2021 | Barreteau et al. | |
| 2003/0034016 | A1 | 2/2003 | Harvey et al. | |
| 2004/0016345 | A1 | 1/2004 | Springett et al. | |
| 2004/0020839 | A1 | 2/2004 | Kato et al. | |
| 2004/0071328 | A1 | 4/2004 | Vaisberg et al. | |
| 2004/0214710 | A1 * | 10/2004 | Herman | B04B 5/10 494/36 |
| 2006/0096263 | A1 | 5/2006 | Kahlbaugh et al. | |
| 2006/0242933 | A1 | 11/2006 | Webb et al. | |
| 2007/0039300 | A1 | 2/2007 | Kahlbaugh et al. | |
| 2007/0175191 | A1 | 8/2007 | Ziebold et al. | |
| 2007/0249479 | A1 | 10/2007 | Eliasson et al. | |
| 2007/0271884 | A1 | 11/2007 | Pearson et al. | |
| 2008/0280777 | A1 | 11/2008 | Bittner et al. | |
| 2009/0000258 | A1 | 1/2009 | Carlsson et al. | |
| 2009/0020486 | A1 | 1/2009 | Barnwell | |
| 2009/0044702 | A1 | 2/2009 | Adamek et al. | |
| 2009/0056292 | A1 | 3/2009 | Fornof et al. | |
| 2009/0067986 | A1 | 3/2009 | Mignano | |
| 2009/0101013 | A1 | 4/2009 | Moredock | |
| 2009/0263238 | A1 | 10/2009 | Jarrah | |
| 2010/0126145 | A1 | 5/2010 | He et al. | |
| 2010/0180854 | A1 | 7/2010 | Baumann et al. | |
| 2010/0192529 | A1 | 8/2010 | Schuster | |
| 2010/0229511 | A1 | 9/2010 | Steins et al. | |
| 2010/0285101 | A1 | 11/2010 | Moore et al. | |
| 2011/0180051 | A1 | 7/2011 | Schwandt et al. | |
| 2011/0198280 | A1 | 8/2011 | Jones et al. | |
| 2011/0247309 | A1 | 10/2011 | Smith et al. | |
| 2011/0252974 | A1 | 10/2011 | Verdegan et al. | |
| 2011/0263496 | A1 | 10/2011 | Fineman et al. | |
| 2012/0034083 | A1 | 2/2012 | Shoji et al. | |
| 2012/0118200 | A1 | 5/2012 | Howell et al. | |
| 2012/0174545 | A1 * | 7/2012 | Tornblom | B04B 9/12 29/889 |
| 2012/0251323 | A1 * | 10/2012 | Chiu | F04D 29/188 416/198 R |
| 2012/0315225 | A1 | 12/2012 | Porbeni et al. | |
| 2013/0037481 | A1 | 2/2013 | Lalouch et al. | |
| 2013/0056407 | A1 * | 3/2013 | Parikh | F02D 23/00 210/360.1 |
| 2013/0167816 | A1 | 7/2013 | Dawar et al. | |
| 2014/0033668 | A1 | 2/2014 | Kleynen | |
| 2014/0069432 | A1 | 3/2014 | Mebasser et al. | |
| 2014/0096683 | A1 | 4/2014 | Azwell et al. | |
| 2014/0326661 | A1 | 11/2014 | Madsen et al. | |
| 2015/0047582 | A1 | 2/2015 | Dawar et al. | |
| 2015/0075377 | A1 | 3/2015 | Gorbach et al. | |
| 2015/0173577 | A1 | 6/2015 | Kim et al. | |
| 2016/0030875 | A1 | 2/2016 | Parikh et al. | |
| 2016/0245157 | A1 | 8/2016 | Wilkins et al. | |
| 2018/0030868 | A1 | 2/2018 | Elsaesser et al. | |
| 2018/0117512 | A1 | 5/2018 | Janakiraman et al. | |
| 2019/0153635 | A1 | 5/2019 | Ikejiri et al. | |

FOREIGN PATENT DOCUMENTS

| | | | |
|---|---|---|---|
| CN | 104334284 | A | 2/2015 |
| DE | 10044615 | A1 | 4/2002 |
| DE | 20302824 | U1 | 8/2004 |
| DE | 10 2006 024 816 | A1 | 12/2007 |
| EP | 1 532 352 | A1 | 5/2005 |
| EP | 1 645 320 | A1 | 4/2006 |
| FR | 2933626 | A1 | 1/2010 |
| JP | h11-141325 | A | 5/1999 |
| WO | WO-2011/100712 | A1 | 8/2011 |
| WO | WO-2012/106659 | A1 | 8/2012 |
| WO | WO-2013/025445 | A2 | 2/2013 |
| WO | WO-2016/046944 | A1 | 3/2016 |
| WO | WO-2016/159951 | A1 | 10/2016 |
| WO | WO-2017/189516 | A1 | 11/2017 |
| WO | WO-2018/002244 | A1 | 1/2018 |

OTHER PUBLICATIONS

Extended European Search Report for European Patent App. No. 17790235.0 dated Oct. 25, 2019, 9 pages.

First Examination Report for Indian Patent App. No. 201847007059 dated May 5, 2020, 6 pages.

(56) References Cited

OTHER PUBLICATIONS

First Office Action for Chinese Patent App. No. 2015800784030 dated Mar. 1, 2019, 19 pages (with translation).
First Office Action for Chinese Patent App. No. 201780024820.6 dated Mar. 31, 2020, 22 pages (with translation).
Holdich, "Centrifugal separation," Fundamentals of Particle Technology, Midland Information Technology and Publishing, pp. 77-90 (2002).
International Search Report and Written Opinion for PCT/US2015/023290, dated Jun. 29, 2015, 9 pages.
International Search Report and Written Opinion for PCT/US2016/036384, dated Aug. 25, 2016, 9 pages.
International Search Report and Written Opinion for PCT/US2016/036432, dated Aug. 31, 2016, 13 pages.
International Search Report and Written Opinion for PCT/US2016/047755, dated Nov. 4, 2016, 10 pages.
International Search Report and Written Opinion for PCT/US2016/048912, dated Nov. 10, 2016, 6 pages.
International Search Report and Written Opinion for PCT/US2017/029315, dated Aug. 1, 2017, 11 pages.
Non-Final Office Action on U.S. Appl. No. 15/580,481 DTD Feb. 14, 2020.
Non-Final Office Action on U.S. Appl. No. 16/096,585 DTD Oct. 16, 2019.
Notice of Allowance issued for U.S. Appl. No. 17/164,369, issued Jun. 21, 2021, 21 pages.
Notice of Allowance on U.S. Appl. No. 15/753,778 DTD Feb. 10, 2020.
Office Action for U.S. Appl. No. 15/561,170 dated Mar. 14, 2019, 11 pages.
Office Action for U.S. Appl. No. 15/746,973 dated Jul. 8, 2020, 34 pages.

* cited by examiner

SYSTEMS AND METHODS FOR ROTATING COALESCERS MAINTAINING POSITIVE RECIRCULATION THROUGH A DYNAMIC SEAL

CROSS REFERENCE TO RELATED APPLICATIONS

This application is a divisional application based on U.S. patent application Ser. No. 15/580,481, filed Dec. 7, 2017, which is a National Phase Application based on PCT/US2016/036432, filed Jun. 8, 2016, which claims the benefit of priority to U.S. Provisional Patent Application No. 62/173,149, filed Jun. 9, 2015. The contents of these applications are incorporated herein by reference in its entirety.

TECHNICAL FIELD

The present application relates to crankcase ventilation (CV) systems that utilize rotating coalescing devices. In particular, the field of the invention relates to CV systems employing rotating coalescing devices that create a positive recirculation effect.

BACKGROUND

During operation of an internal combustion engine, a fraction of combustion gases can flow out of the combustion cylinder and into the crankcase of the engine. These gases are often called “blowby” gases. Typically, the blowby gases are routed out of the crankcase via a CV system. The CV system passes the blowby gases through a coalescer (i.e., a coalescing filter element) to remove a majority of the aerosols and oils contained in the blowby gases. The filtered blowby gases are then either vented to the ambient (in open CV systems) or routed back to the air intake for the internal combustion engine for further combustion (in closed CV systems).

Many CV systems utilize rotating coalescers. Rotating coalescers may include fibrous filters as well as centrifugal separation devices. Performance attributes of rotating coalescer devices may be measured in terms of pressure drop (or rise) through the device and efficiency of oil removal. In rotating coalescers, the oil droplets (e.g., aerosol) suspended and transported by the blowby gases are separated inside the coalescer media through the particle capture mechanisms of inertial impaction, interception, and diffusion onto the fibers. By rotating the media, inertial impaction is enhanced by the additional centrifugal force. In addition to this aspect, after the oil droplets coalesce to form larger drops, the centrifugal force removes the larger drops by overcoming the surface drag force of the media fibers. This aspect increases the collection of and the discharge of oil from the coalescer by providing improved drainage compared to a stationary coalescer. In turn, the improved drainage from the rotating coalescing filter aids in improving the filtration efficiency as well as greatly reducing the pressure drop across the filter.

Because a rotating coalescer is positioned within a static filter housing, there is typically a slight gap between the rotating components and the stationary housing. For example, a gap may exist between the static inlet of the housing and the rotating inlet opening of the rotating coalescer. This gap can allow unfiltered aerosol contained in the blowby gases to bypass the rotating coalescer if the downstream pressure on the clean side of the rotating media in the radial vicinity of the gap is lower than the upstream pressure on the dirty side of the rotating media in the radial vicinity of the gap. Example gaps are shown, for example, in U.S. Pat. No. 4,189,310, entitled “APPARATUS FOR REMOVING OIL MIST,” by Hotta (see, e.g., the gaps in FIGS. 4). The bypass of unfiltered blowby gases can be detrimental to the efficiency of the CV system, particularly at larger aerosol sizes for which the filtering medium is highly efficient at removing.

SUMMARY

One example embodiment relates to a CV system. The CV system includes a housing, an inlet configured to receive blowby gases from an internal combustion engine and to provide the blowby gases to the housing, and an outlet configured to provide filtered blowby gases from the housing and to at least one of an intake of the internal combustion engine and the surrounding ambient. The CV system further includes a rotating coalescer positioned within the housing such that a gap exists between the rotating coalescer and the housing. The rotating coalescer includes a first endcap and a filter media. The gap permits gas flow between a clean side of the filter media and a dirty side of the filter media. The CV system includes a central shaft coupled to the rotating coalescer. The central shaft is rotatable such that when the central shaft rotates, the rotating coalescer rotates and creates a pumping pressure that causes a high pressure within the housing on the clean side of the filter media and a low pressure on the dirty side of the filter media. The pressure differential causes a positive recirculation of the blowby gases in which a portion of already filtered blowby gas from the clean side of the filter media returns through the gap to the dirty side of the filter media.

Another example embodiment relates to a CV system. The CV system includes a housing, an inlet configured to receive blowby gases from an internal combustion engine and to provide the blowby gases to the housing, and an outlet configured to provide filtered blowby gases from the housing and to at least one of an intake of the internal combustion engine and the surrounding ambient. The CV system further includes a rotating separating element positioned within the housing such that a gap exists between the rotating separating element and the housing. The gap permits gas flow between a clean side of the rotating separating element and a dirty side of the rotating separating element. The CV system includes a central shaft coupled to the rotating separating element. The central shaft is rotatable such that when the central shaft rotates, the rotating separating element rotates and creates a pumping pressure that causes a high pressure within the housing on the clean side of the rotating separating element and a low pressure on the dirty side of the rotating separating element. The pressure differential causes a positive recirculation of the blowby gases in which a portion of already filtered blowby gas from the clean side of the rotating separating element returns through the gap to the dirty side of the rotating separating element.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, rotating coalescer CV systems are described. The described CV systems utilize a pumping pressure created by the porous media and/or internal radial ribs or spiral vanes of a rotating separating element, such as a rotating coalescer, to maintain positive recirculation of filtered blowby gases through a potential leak gap between a static housing inlet and a spinning component of the rotating coalescer. In some arrangements, the porous media is fibrous media. The filter media may be pleated or non-pleated. The positive recirculation caused by the pressure balance prevents unfiltered blowby gases from bypassing the media of the rotating coalescer from the upstream side to the downstream side of the filter media through the gap. During operation, the pressure balance between the upstream side and downstream side of the filter media maintains the positive recirculation, which in turn maintains a high filtration efficiency.

Figure 1:
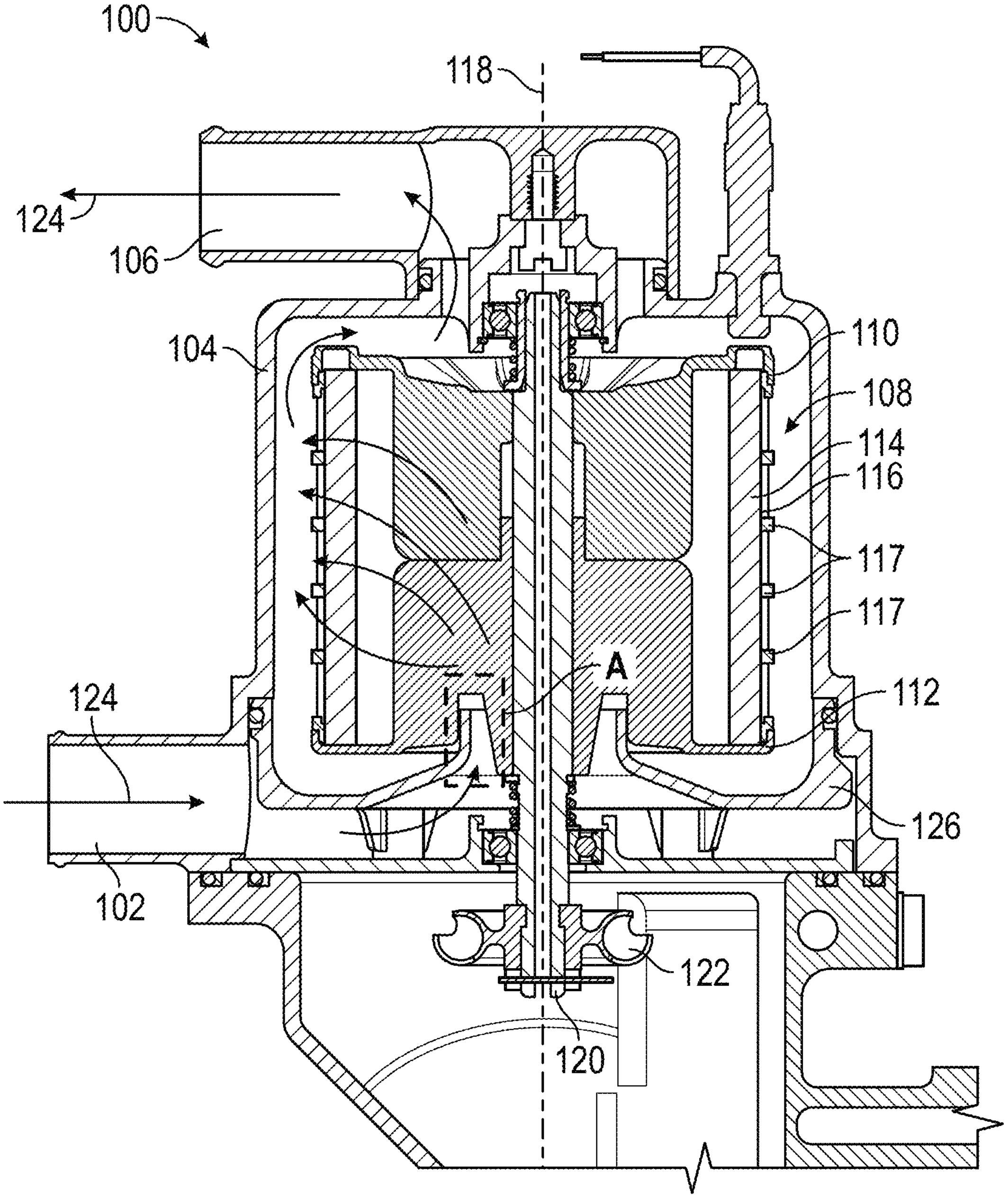
FIG. 1 is a cross-sectional view of a CV system 100 according to an example embodiment.

Referring to FIG. 1, a cross-sectional view of a CV system 100 is shown according to an example embodiment. The CV system 100 includes a blowby gas inlet 102 that receives blowby gas from a crankcase of an internal combustion engine to a housing 104 of the CV system 100. The inlet 102 is coupled to the housing 104. The housing 104 is a stationary or static housing. The CV system 100 includes a blowby gas outlet 106 that outputs filtered blowby gas during operation of the CV system 100. The outlet 106 is coupled to the housing 104. The outlet 106 may be coupled to an air intake of the internal combustion engine (e.g., in a closed CV system arrangement) or may vent to the ambient (e.g., in an open CV system arrangement). The CV system includes a rotating coalescer 108 positioned within the housing. The rotating coalescer 108 is a rotating separating element. The rotating coalescer 108 includes a first endcap 110 and a second endcap 112. It should be understood, however, that the rotating coalescer could also have only single endcap, instead of both a first endcap 110 and a second endcap 112, in certain alternative embodiments. A filter media 114 is positioned between the first and second endcaps 110 and 112. In some arrangements, a frame 116 surrounds an outside surface of the filter media 114 to provided structural support to the filter media 114 when the rotating coalescer 108 is rotating. The frame 116 includes a plurality of vanes 117. The vanes 117 act as centrifugal fan blades so as to contribute to a pumping pressure created by the rotating coalescer 108. The vanes 117 may be arranged as radial ribs or spiral vanes. The creation of the pumping pressure by the rotating coalescer 108 is described in further detail below.

During operation, the rotating coalescer 108 is rotated along its central axis 118 by a central shaft 120 coupled to the rotating coalescer. The first and second endcaps 110 and 112 are secured to the central shaft 120 such that when the central shaft 120 rotates, the filter media 114 rotates. As shown in FIG. 1, the central shaft is rotated by a pelton wheel 122 that is spun by a pressurized stream of fluid (e.g., engine oil, hydraulic fluid, etc.). In alternative arrangements, the central shaft 120 is rotated by a separate electric motor, a chain drive system, or a belt drive system. As the rotating coalescer 108 rotates, blowby gas flows along flow path 124. The flow path 124 directs the blowby gas into the inlet, 102, through the second endplate 112 and into a central area surrounded by the filter media 114, through the filter media 114, and out of the housing 104 via the outlet 106. As the blowby gas passes through the filter media 114, oil suspended in the blowby gas, such as aerosols, are separated. The separated oil is collected in a drain pan 126 and drained back to the crankcase. The drain pain 126 may be a stationary part coupled to the housing 104 or integral with the housing 104.

Figure 2:
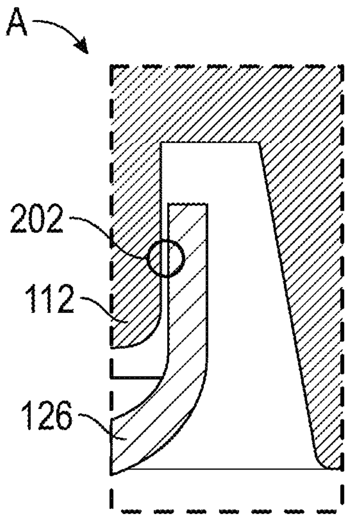
FIG. 2 is a close-up cross-sectional view of a portion of the CV system of FIG. 1.

Referring to FIG. 2, a close-up cross-sectional view of portion A of the CV system 100 is shown. As shown in FIG. 2, a gap 202 exists between the drain pan 126 and the central shaft 120 or the second endplate 112 of the rotating coalescer 108. The gap 202 potentially permits a potential leak path that allows the blowby gases entering the CV system 100 to bypass the rotating coalescer 108. However, the rotating coalescer 108 is designed to create a pumping pressure that causes a high pressure within the housing 104 on a clean side of the filter media 114, and a low pressure on a dirty side of the filter media 114 (e.g., in the central area of the rotating coalescer 108). Accordingly, a portion of the already filtered blowby gas flows from the high pressure area of the housing 104, through the gap 202, and back into the rotating coalescer 108 for further filtration. The recirculation of the blowby gas is described in further detail below with respect to FIG. 3.

Figure 3:
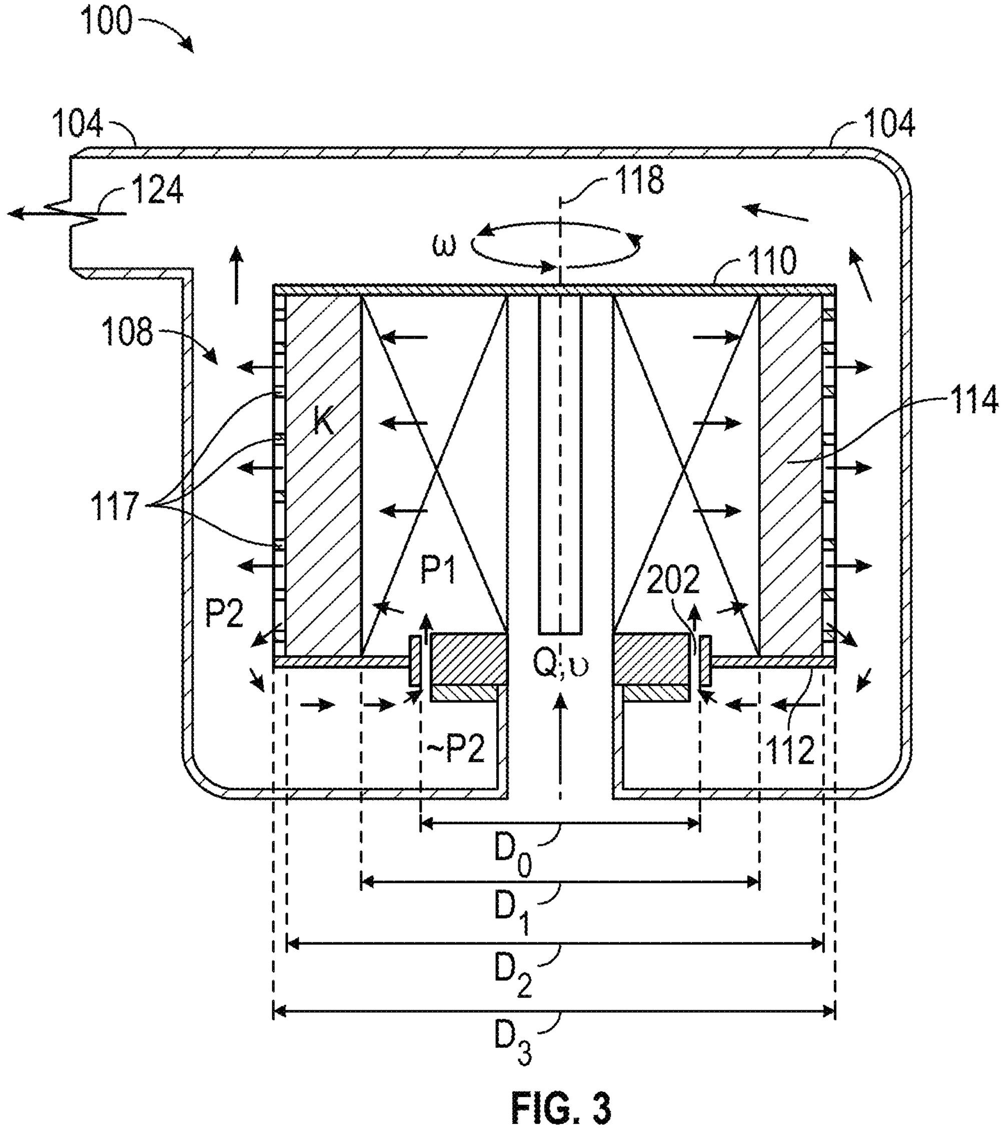
FIG. 3 is a simplified cross-sectional view of the CV system of FIG. 1.

FIG. 3 shows a simplified cross-sectional view of the CV system 100. As shown in FIG. 3, blowby gas follows the flow path 124 into the inlet 102. The flow of blowby gas pass through either the filter media 114 or the gap 202 (as shown in FIG. 2). The flow split between the flow going thought the gap and filter media depends on pressure drop across gap 202 and filter media 114. When the rotating coalescer 108 is rotating, the filter media 114 creates centrifugal "pumping" pressure due to its rotational velocity "@", which creates higher pressure P2 at the outer (downstream or clean) side of the rotating coalescer 108 than P1 at the inner (upstream or dirty) side of the filter media 114 and at the inlet of the gap 202 at diameter $D_0$. In some arrangements, the radial 117 also contribute to the pumping pressure. This pressure situation exists when certain design criteria of the CV system 100 are met. The design criteria relates to the magnitude of rotational velocity "ω", flowrate "Q", dimensions $D_0$, $D_1$, $D_2$, $D_3$, and the average intrinsic permeability of filter media 114 "K" in the approximately direction of gas flow through the filter media 114.

The rotating coalescer 108 can have filter media arrangements that include a single layer or multiplayer construction, in which different physical properties (e.g., fiber diameter, porosity, etc.) are combined in a series. For arrangements that utilize a single layer of media, the intrinsic permeability of the filter media 114 is defined below in equation 1.

$$\kappa = \frac{v \cdot \mu \cdot t}{\Delta P} \quad (1)$$

In equation 1, κ has dimensional units of length squared, V is the superficial fluid velocity through the media 114, μ is the fluid viscosity, t is the media thickness, and ΔP is the pressure drop across the media 114 from an upstream position to a downstream position.

For single and multilayer media constructions, the average intrinsic permeability through the media 114 is defined by equation 2.

$$\frac{\sum_i^n t_i}{\sum_i^n \left(\frac{t_i}{\kappa_i}\right)} \tag{2}$$

In equation 2, n is the number of layers of media, $t_i$ is the thickness of layer "i", and $\kappa_i$ is the intrinsic permeability of layer "i".

A simple numeric example of the average intrinsic permeability calculation for a three layer multilayer media construction is shown below in Table 1.

TABLE 1

| Layer "n" | Layer Thickness | Layer Intrinsic Perm. | Thickness/ Permeability |
|---|---|---|---|
| layer 1 | 0.2 | 5 | 0.04 |
| layer 2 | 1 | 10 | 0.1 |
| layer 3 | 5 | 20 | 0.25 |
| Total Thickness: | 6.2 | Total Thickness/ Permeability: | 0.39 |

Average composite intrinsic permeability: 15.9

Experimentally, the average intrinsic permeability can simply be measured by maintaining air flow through a flat sample of the multilayer porous media under controlled conditions of gas viscosity (μ) and superficial velocity (v) while measuring the pressure drop from the upstream side of the media to the downstream side of the media. The average intrinsic permeability is calculated using equation 1 above.

As illustrated in FIG. 3, if pressure P2>P1, then "positive" recirculation exists, whereby a portion of filtered gas from the clean side of the filter media 114 returns through the rotating gap to the upstream, dirty side of the filter media 114, thus recirculating and causing no loss in filtration efficiency. Alternatively, it can be said that if pressure P2<P1, then "negative" recirculation exists whereby a meaningful percentage of the aerosol-laden blowby gas can pass to the clean side of the filter media 114 through the gap 202 thereby bypassing the filter media 114, causing a reduction in filtration efficiency.

As noted above, positive recirculation of the blowby gas through the gap 202 is achieved when P2>P1 (alternatively stated as P2/P1>1). This situation can be achieved by intentionally selecting an optimum combination of the following critical parameters for the rotating coalescer 108 and the CV system 100. Table 2 describes the various design parameters that are utilized in calculating the optimal CV system 100 design to achieve the positive recirculation.

TABLE 2

| Symbol | Description | Units |
|---|---|---|
| ρ | gas density | kg/m$^3$ |
| ω | rotational speed | rad/s |
| h | media height | m |
| $D_0$ | inside diameter of rotating annul portion of element | m |
| $D_1$ | media inner diameter | m |
| $D_2$ | media outer diameter | m |
| $D_3$ | element outer diameter | m |
| μ | gas viscosity | kg/m · s |
| ν | gas kinematic viscosity | m$^2$/s |
| Q | gas flowrate | m$^3$/s |
| κ | average intrinsic permeability of media | m$^2$ |

As described in further detail below, different design parameter optimizations are utilized depending on whether the filter media 114 is comprised of a pleated porous media or a non-pleated porous media.

In arrangements where the filter media 114 is an annular porous non-pleated media, if the condition of equation 3 is met, P2>P1 is maintained and positive gas recirculation occurs.

$$\frac{\pi\cdot\kappa\cdot\omega^2\cdot h\cdot\left(D_3^2-D_0^2\right)}{4\cdot Q\cdot\upsilon\cdot\ln\left(\frac{D_2}{D_1}\right)}>1 \tag{3}$$

Figure 4:
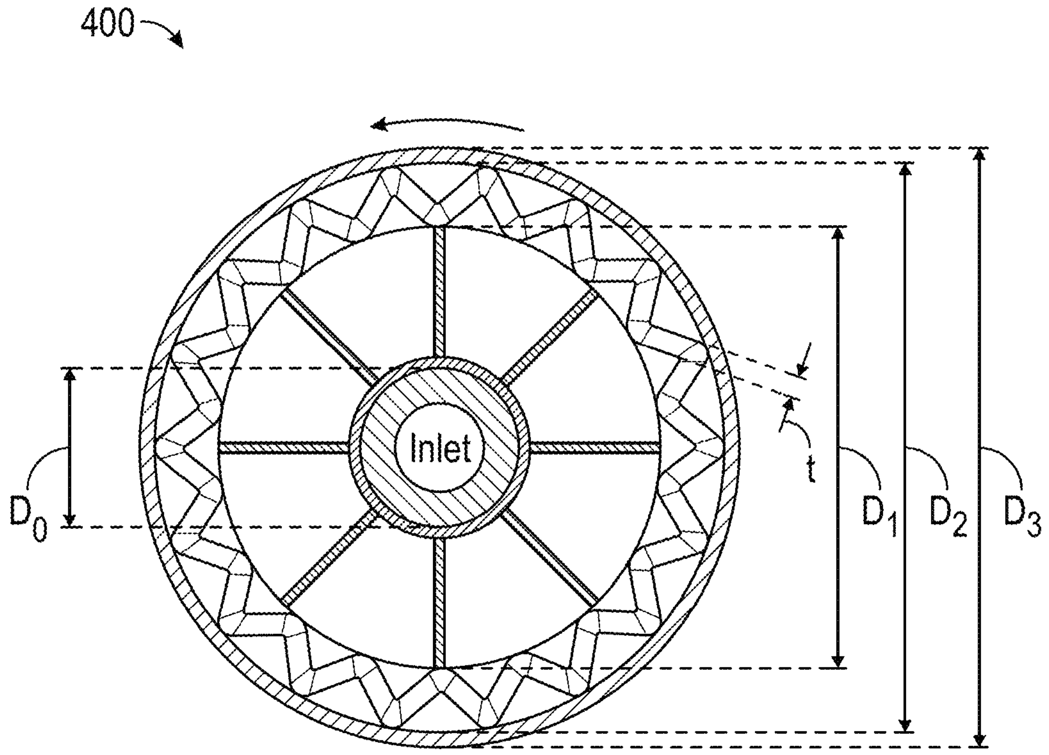
FIG. 4 is a cross-sectional view of a pleated annular filter element is shown according to an example embodiment.

In other arrangements, the filter media 114 is an annular porous pleated media. For example, a cross-sectional view of a pleated annular filter element 400 is shown according to an example embodiment. As shown in FIG. 4, the pleats of the pleated annular filter element 400 are arranged within the annular zone defined by the outer diameter $D_2$ and the inner diameter $D_1$. The additional terms required for determining the optimized size and arrangement of the pleated annular filter element 400 are the number of pleats (N) and the thickness of the media normal to the flow direction through the media (t, measure in m). The number of pleats must be greater than 2, and typically is greater than 10. Accordingly, for arrangements utilizing the pleated annular filter element 400, positive gas recirculation occurs when the condition of equation 4 is satisfied.

$$\frac{\kappa\cdot N\cdot h\cdot\left(D_2^2-2D_1D_2\cos\left(\frac{\pi}{N}\right)+D_1^2\right)^{\frac{1}{2}}\cdot\omega^2\cdot\left(D_3^2-D_0^2\right)}{8\cdot Q\cdot\upsilon\cdot t}>1 \tag{4}$$

As shown in equations 3 and 4, different CV system 100 designs having a widely different sizes, operating speeds, and/or flow rates may require filtering media with significantly different intrinsic characteristics. For example, diesel engine CV applications for on-highway and off-highway equipment are typically constrained by practical considerations such as space available in the vicinity of the engine, energy available for inducing rotation of the rotating coalescer, and the strength of economically available materials of construction. Accordingly, it is preferable to design rotating porous or fibrous medium coalescers that may be utilized across multiple different applications and that share a range of common filtering medium properties across a very broad range of engine sizes and rotating coalescer operating speeds and sizes.

A narrower range of values for preferred arrangements of rotating porous medium coalescers can be defined utilizing a dimensionless parameter of, $$N_{hyd}=\frac{t}{\sqrt{\kappa}},$$

which represents the average number of hydraulic radii through the thickness of the media in the flow direction. Example design parameters and approximate maximum preferred values of $N_{hyd}$ for annular non-pleated coalescers are set forth below in tables 3 through 6.

TABLE 3

| Exemplary Engine Displacement, liters | Nominal Flow Rate, liters/min | Exemplary Design Blow-by Flow Rate, liters/min | Media Rotation Speed, RPM | Element OD, mm | Media OD, mm | Media Height, mm | ID of Rotating Element Annul, mm | Maximum # of Hydraulic Radii for Different Media Thickness, at Design Blowby Flow Rate Media Thickness, mm | | | |
|---|---|---|---|---|---|---|---|---|---|---|---|
| Relatively High Speed Media Elements with Height to OD Aspect Ratio ~= 1 | | | | | | | | 1 | 3 | 10 | 25 |
| 3 | 45 | 75 | 11000 | 73 | 67 | 67 | 30 | 615 | 1048 | 1798 | 2285 |
| 4 | 60 | 100 | 11000 | 73 | 67 | 67 | 30 | 533 | 908 | 1557 | 1979 |
| 5 | 75 | 125 | 10000 | 83 | 77 | 77 | 35 | 563 | 963 | 1666 | 2232 |
| 6.7 | 101 | 168 | 10000 | 83 | 77 | 77 | 35 | 487 | 831 | 1439 | 1928 |
| 8.9 | 134 | 223 | 10000 | 83 | 77 | 77 | 35 | 422 | 721 | 1249 | 1673 |
| 11 | 165 | 275 | 10000 | 95 | 89 | 89 | 45 | 488 | 836 | 1460 | 2027 |
| 13 | 195 | 325 | 10000 | 95 | 89 | 89 | 45 | 449 | 769 | 1343 | 1864 |
| 15 | 225 | 375 | 9000 | 115 | 107 | 107 | 52 | 555 | 953 | 1677 | 2403 |
| 19 | 285 | 475 | 8500 | 125 | 117 | 117 | 52 | 565 | 970 | 1713 | 2484 |
| 30 | 450 | 750 | 7500 | 135 | 127 | 159 | 60 | 512 | 880 | 1560 | 2282 |

TABLE 4

| Exemplary Engine Displacement, liters | Nominal Flow Rate, liters/min | Exemplary Design Blow-by Flow Rate, liters/min | Media Rotation Speed, RPM | Element OD, mm | Media OD, mm | Media Height, mm | ID of Rotating Element Annul, mm | Maximum # of Hydraulic Radii for Different Media Thickness, at Design Blowby Flow Rate Media Thickness, mm | | | |
|---|---|---|---|---|---|---|---|---|---|---|---|
| Moderate Speed Elements with Aspect Ratios < 1 | | | | | | | | 1 | 3 | 10 | 25 |
| 3 | 45 | 75 | 6000 | 100 | 94 | 45 | 30 | 466 | 798 | 1397 | 1961 |
| 4 | 60 | 100 | 6000 | 100 | 94 | 45 | 30 | 404 | 691 | 1210 | 1698 |
| 5 | 75 | 125 | 6000 | 113 | 107 | 51 | 35 | 465 | 798 | 1405 | 2013 |
| 6.7 | 101 | 168 | 6000 | 113 | 107 | 51 | 35 | 402 | 689 | 1214 | 1739 |
| 8.9 | 134 | 223 | 6000 | 113 | 107 | 51 | 35 | 349 | 598 | 1053 | 1509 |
| 11 | 165 | 275 | 5000 | 131 | 123 | 59 | 45 | 343 | 590 | 1044 | 1521 |
| 13 | 195 | 325 | 5000 | 131 | 123 | 59 | 45 | 316 | 543 | 960 | 1400 |
| 15 | 225 | 375 | 5000 | 154 | 146 | 71 | 52 | 416 | 716 | 1274 | 1888 |
| 19 | 285 | 475 | 5000 | 167 | 159 | 78 | 52 | 442 | 761 | 1357 | 2024 |
| 30 | 450 | 750 | 4200 | 180 | 172 | 106 | 60 | 383 | 659 | 1178 | 1767 |

TABLE 5

| Exemplary Engine Displacement, liters | Nominal Flow Rate, liters/min | Exemplary Design Blow-by Flow Rate, liters/min | Media Rotation Speed, RPM | Element OD, mm | Media OD, mm | Media Height, mm | ID of Rotating Element Annul, mm | Maximum # of Hydraulic Radii for Different Media Thickness, at Design Blowby Flow Rate Media Thickness, mm | | | |
|---|---|---|---|---|---|---|---|---|---|---|---|
| Lower Speed, Larger Media Elements with Aspect Ratios = 1 | | | | | | | | 1 | 3 | 10 | 25 |
| 3 | 45 | 75 | 4500 | 87 | 81 | 81 | 30 | 369 | 631 | 1095 | 1485 |
| 4 | 60 | 100 | 4500 | 87 | 81 | 81 | 30 | 319 | 546 | 948 | 1286 |
| 5 | 75 | 125 | 4500 | 98 | 92 | 92 | 35 | 369 | 632 | 1104 | 1544 |
| 6.7 | 101 | 168 | 4500 | 98 | 92 | 92 | 35 | 319 | 546 | 954 | 1333 |
| 8.9 | 134 | 223 | 4500 | 93 | 92 | 92 | 35 | 276 | 473 | 828 | 1157 |
| 11 | 165 | 275 | 4500 | 112 | 106 | 105 | 45 | 320 | 549 | 965 | 1381 |
| 13 | 195 | 325 | 4500 | 112 | 106 | 106 | 45 | 294 | 505 | 888 | 1271 |
| 15 | 225 | 375 | 4500 | 135 | 127 | 127 | 52 | 397 | 683 | 1209 | 1768 |
| 19 | 285 | 475 | 4000 | 146 | 138 | 138 | 52 | 377 | 647 | 1150 | 1696 |
| 30 | 450 | 750 | 3500 | 158 | 150 | 150 | 60 | 303 | 522 | 929 | 1379 |

TABLE 6

| Exemplary Engine Displacement, liters | Nominal Flow Rate, liters/min | Exemplary Design Blow-by Flow Rate, liters/min | Media Rotation Speed, RPM | Element OD, mm | Media OD, mm | Media Height, mm | ID of Rotating Element Annul, mm | Maximum # of Hydraulic Radii for Different Media Thickness, at Design Blowby Flow Rate Media Thickness, mm | | | |
|---|---|---|---|---|---|---|---|---|---|---|---|
| Higher Speed, Compact Size Media Elements with Aspect Ratios = 1 | | | | | | | | 1 | 3 | 10 | 25 |
| 3 | 45 | 75 | 12000 | 60 | 54 | 54 | 30 | 413 | 701 | 1178 | 1220 |
| 4 | 60 | 100 | 12000 | 60 | 54 | 54 | 30 | 357 | 607 | 1020 | 1056 |
| 5 | 75 | 125 | 12000 | 68 | 62 | 62 | 35 | 421 | 717 | 1221 | 1487 |
| 6.7 | 101 | 168 | 12000 | 68 | 62 | 62 | 35 | 364 | 619 | 1055 | 1285 |
| 8.9 | 134 | 223 | 11000 | 68 | 62 | 62 | 35 | 289 | 492 | 839 | 1022 |
| 11 | 155 | 275 | 11000 | 78 | 72 | 72 | 45 | 333 | 568 | 979 | 1284 |
| 13 | 195 | 325 | 10000 | 78 | 72 | 72 | 45 | 278 | 475 | 819 | 1074 |
| 15 | 225 | 375 | 10000 | 94 | 88 | 88 | 52 | 382 | 654 | 1140 | 1577 |
| 19 | 285 | 475 | 9000 | 102 | 96 | 96 | 52 | 379 | 649 | 1136 | 1601 |
| 30 | 450 | 750 | 8000 | 113 | 105 | 105 | 60 | 316 | 542 | 954 | 1362 |

Example design parameters and approximate maximum preferred values of $N_{hyd}$ for annular pleated coalescers are set forth below in tables 7 through 10.

TABLE 7

| Exemplary Engine Displacement, liters | Exemplary Design Blow-by Flow Rate, liters/min | Media Rotation Speed, RPM | Element OD, mm | Media OD, mm | Media ID, mm | Media Height, mm | ID of Rotating Element Annul, mm | Number of Pleats and Maximum Hydraulic Radii for Different Media Thickness, at Design Blowby Flow Rate Media Thickness, mm | | | | | | | |
|---|---|---|---|---|---|---|---|---|---|---|---|---|---|---|---|
| Relatively High Speed Media Elements with Height to OD Aspect Ratio | | | | | | | | # Plts | 0.5 | # Plts | 1 | # Plts | 2 | # Plts | 4 |
| 3 | 75 | 11000 | 73 | 67 | 47 | 67 | 30 | 22 | 659 | 21 | 792 | 15 | 1120 | 9 | 1363 |
| 4 | 100 | 11000 | 73 | 67 | 47 | 67 | 30 | 22 | 571 | 21 | 686 | 15 | 970 | 9 | 1180 |
| 5 | 125 | 10000 | 83 | 77 | 57 | 77 | 35 | 27 | 619 | 26 | 742 | 18 | 1049 | 11 | 1273 |
| 6.7 | 168 | 10000 | 83 | 77 | 57 | 77 | 35 | 27 | 534 | 26 | 641 | 18 | 906 | 11 | 1100 |
| 8.9 | 223 | 10000 | 83 | 77 | 57 | 77 | 35 | 27 | 464 | 26 | 556 | 18 | 786 | 11 | 955 |
| 11 | 275 | 10000 | 95 | 89 | 59 | 89 | 45 | 28 | 611 | 26 | 720 | 19 | 1018 | 12 | 1197 |
| 13 | 325 | 10000 | 95 | 89 | 59 | 89 | 45 | 28 | 562 | 26 | 662 | 19 | 936 | 12 | 1101 |
| 15 | 375 | 9000 | 115 | 107 | 77 | 107 | 52 | 36 | 722 | 35 | 850 | 24 | 1202 | 15 | 1408 |
| 19 | 475 | 8500 | 125 | 117 | 87 | 117 | 52 | 41 | 746 | 39 | 877 | 27 | 1241 | 17 | 1452 |
| 30 | 750 | 7500 | 135 | 127 | 97 | 159 | 60 | 46 | 685 | 44 | 805 | 30 | 1139 | 19 | 1332 |

TABLE 8

| Exemplary Engine Displacement, liters | Exemplary Design Blow-by Flow Rate, liters/min | Media Rotation Speed, RPM | Element OD, mm | Media OD, mm | Media ID, mm | Media Height, mm | ID of Rotating Element Annul, mm | Number of Pleats and Maximum Hydraulic Radii for Different Media Thickness, at Design Blowby Flow Rate Media Thickness, mm | | | | | | | |
|---|---|---|---|---|---|---|---|---|---|---|---|---|---|---|---|
| Moderate Speed Elements with Aspect Ratios < 1 | | | | | | | | # Plts | 0.5 | # Plts | 1 | # Plts | 2 | # Plts | 4 |
| 3 | 75 | 6000 | 100 | 94 | 74 | 45 | 30 | 35 | 526 | 33 | 630 | 23 | 890 | 15 | 1078 |
| 4 | 100 | 6000 | 100 | 94 | 74 | 45 | 30 | 35 | 456 | 33 | 545 | 23 | 771 | 15 | 933 |
| 5 | 125 | 6000 | 113 | 107 | 77 | 51 | 35 | 36 | 605 | 35 | 712 | 24 | 1007 | 15 | 1180 |
| 6.7 | 168 | 6000 | 113 | 107 | 77 | 51 | 35 | 36 | 522 | 35 | 615 | 24 | 870 | 15 | 1019 |
| 8.9 | 223 | 6000 | 113 | 107 | 77 | 51 | 35 | 36 | 453 | 35 | 534 | 24 | 755 | 15 | 884 |
| 11 | 275 | 5000 | 131 | 123 | 93 | 59 | 45 | 44 | 457 | 42 | 537 | 29 | 760 | 18 | 889 |
| 13 | 325 | 5000 | 131 | 123 | 93 | 59 | 45 | 44 | 420 | 42 | 494 | 29 | 699 | 18 | 818 |
| 15 | 375 | 5000 | 154 | 146 | 116 | 71 | 52 | 55 | 567 | 52 | 666 | 36 | 942 | 23 | 1101 |
| 19 | 475 | 5000 | 167 | 159 | 129 | 78 | 52 | 61 | 608 | 58 | 714 | 41 | 1010 | 25 | 1179 |
| 30 | 750 | 4200 | 180 | 172 | 142 | 106 | 60 | 67 | 531 | 64 | 624 | 45 | 882 | 28 | 1029 |

TABLE 9

| Exemplary Engine Displacement, liters | Exemplary Design Blow-by Flow Rate, liters/min | Media Rotation Speed, RPM | Element OD, mm | Media OD, mm | Media ID, mm | Media Height, mm | ID of Rotating Element Annul, mm | Number of Pleats and Maximum Hydraulic Radii for Different Media Thickness, at Design Blowby Flow Rate Media Thickness, mm | | | | | | | |
|---|---|---|---|---|---|---|---|---|---|---|---|---|---|---|---|
| Lower Speed, Larger Media Elements with Aspect Ratios = 1 | | | | | | | | # Plts | 0.5 | # Plts | 1 | # Plts | 2 | # Plts | 4 |
| 3 | 75 | 4500 | 87 | 81 | 61 | 81 | 30 | 29 | 408 | 27 | 489 | 19 | 691 | 12 | 839 |
| 4 | 100 | 4500 | 87 | 81 | 61 | 81 | 30 | 29 | 353 | 27 | 423 | 19 | 599 | 12 | 726 |
| 5 | 125 | 4500 | 98 | 92 | 72 | 92 | 35 | 34 | 415 | 32 | 497 | 23 | 703 | 14 | 851 |
| 6.7 | 168 | 4500 | 98 | 92 | 62 | 92 | 35 | 29 | 401 | 28 | 473 | 19 | 669 | 12 | 786 |
| 8.9 | 223 | 4500 | 98 | 92 | 62 | 92 | 35 | 29 | 348 | 28 | 410 | 19 | 580 | 12 | 682 |
| 11 | 275 | 4500 | 112 | 106 | 76 | 106 | 45 | 36 | 415 | 34 | 488 | 24 | 691 | 15 | 810 |
| 13 | 325 | 4500 | 112 | 106 | 76 | 106 | 45 | 36 | 382 | 34 | 449 | 24 | 635 | 15 | 745 |
| 15 | 375 | 4500 | 135 | 127 | 97 | 127 | 52 | 45 | 531 | 43 | 624 | 30 | 883 | 19 | 1032 |
| 19 | 475 | 4000 | 146 | 138 | 108 | 138 | 52 | 51 | 509 | 48 | 599 | 34 | 847 | 21 | 989 |
| 30 | 750 | 3500 | 158 | 150 | 120 | 150 | 60 | 56 | 414 | 54 | 487 | 38 | 688 | 23 | 804 |

TABLE 10

| Exemplary Engine Displacement, liters | Exemplary Design Blow-by Flow Rate, liters/min | Media Rotation Speed, RPM | Element OD, mm | Media OD, mm | Media ID, mm | Media Height, mm | ID of Rotating Element Annul, mm | Number of Pleats and Maximum Hydraulic Radii for Different Media Thickness, at Design Blowby Flow Rate Media Thickness, mm | | | | | | | |
|---|---|---|---|---|---|---|---|---|---|---|---|---|---|---|---|
| Higher Speed, Compact Size Media Elements with Aspect Ratios = 1 | | | | | | | | # Plts | 0.5 | # Plts | 1 | # Plts | 2 | # Plts | 4 |
| 3 | 75 | 12000 | 60 | 54 | 34 | 54 | 30 | 16 | 421 | 15 | 507 | 11 | 717 | 7 | 877 |
| 4 | 100 | 12000 | 60 | 54 | 34 | 54 | 30 | 16 | 364 | 15 | 439 | 11 | 621 | 7 | 759 |
| 5 | 125 | 12000 | 68 | 62 | 42 | 62 | 35 | 20 | 444 | 19 | 534 | 13 | 755 | 8 | 921 |
| 6.7 | 168 | 12000 | 68 | 62 | 42 | 62 | 35 | 20 | 384 | 19 | 461 | 13 | 652 | 8 | 796 |
| 8.9 | 223 | 11000 | 68 | 62 | 42 | 62 | 35 | 20 | 305 | 19 | 367 | 13 | 519 | 8 | 633 |
| 11 | 275 | 11000 | 78 | 72 | 52 | 72 | 45 | 25 | 362 | 23 | 434 | 16 | 613 | 10 | 746 |
| 13 | 325 | 10000 | 78 | 72 | 52 | 72 | 45 | 25 | 302 | 23 | 363 | 16 | 513 | 10 | 624 |
| 15 | 375 | 10000 | 94 | 88 | 58 | 88 | 52 | 27 | 475 | 26 | 561 | 18 | 793 | 11 | 932 |
| 19 | 475 | 9000 | 102 | 96 | 66 | 96 | 52 | 31 | 481 | 30 | 567 | 21 | 802 | 13 | 942 |
| 30 | 750 | 8000 | 113 | 105 | 75 | 105 | 60 | 35 | 409 | 33 | 482 | 23 | 681 | 15 | 799 |

As shown above in Tables 3-10, particular embodiments of rotating coalescers for diesel engine crankcase ventilation applications generally indicate that values of $N_{hyd}$ less than approximately 3000 are required to avoid bypassing unfiltered flow though the clearance seal, with several cases requiring lesser values than 3000. These embodiments, listed for engine displacements ranging from 3-30 liters and blowby flowrates of 75-750, respectively, are applicable across a wide range of commercial gasoline, diesel, natural gas, or other alternatively fueled engine applications.

Preferred values of $N_{hyd}$ tend to depend on the thickness of the employed media. In many arrangements of annular non-pleated media, preferential maximum values for $N_{hyd}$ include: 500 for media with 0-0.5 mm thickness, 700 for 0.5-1 mm thick media, 1000 for 1-2 mm thick media, 1300 for 2-4 mm thick media, 1800 for 4-8 mm thick media, 2300 for 8-15 mm thick media, 3000 for 15-30 mm thick media, and 4000 for >30 mm thick media. In many arrangements of annular pleated media, preferential maximum values for $N_{hyd}$ include: 800 for media with 0-0.5 mm thickness, 950 for 0.5-1 mm thick media, 1400 for 1-2 mm thick media, 1700 for 2-4 mm thick media, and 2000 for 4-8 mm thick media, and somewhat larger values for media thicker than 8 mm. Nevertheless, it is possible that certain applications with very different amount of physical installation space available and other competing design objectives would maintain the efficiency benefits from positive recirculation at higher or lower values than those taught above, thus it can be beneficial to simply maintain adherence to criteria for maximum number of hydraulic radii for annular non-pleated porous filter elements and pleated porous filter elements, respectively, such that recirculation flow is maintained.

Equation 5 defines the criteria for maximum number of hydraulic radii for annular non-pleated porous filter elements, and equation 6 defines the criteria for maximum number of hydraulic radii for annular pleated porous filter elements, above which unfiltered gas would be expected to bypass the dynamic clearance seal.

$$N_{hyd(annular)} < \sqrt{\frac{\pi \cdot h \cdot (D_2 - D_1)^2 \cdot \omega^2 \cdot (D_3^2 - D_0^2)}{16 \cdot Q \cdot \upsilon \cdot \ln\left(\frac{D_2}{D_1}\right)}} \tag{5}$$

$$N_{hyd(pleated)} < \sqrt{\frac{N \cdot h \cdot \left(D_2^2 - 2D_1 D_2 \cos\left(\frac{\pi}{N}\right) + D_1^2\right)^{\frac{1}{2}} \cdot t \cdot \omega^2 \cdot (D_3^2 - D_0^2)}{8 \cdot Q \cdot \upsilon}} \tag{6}$$

Furthermore, fibrous coalescing filtering efficiency is typically higher for elements with media having greater total hydraulic radii count in the flow direction, due to smallness of pore or fiber, or number of opportunities for aerosol droplets and particulate matter to become captured within the medium as flow proceeds through the media from upstream to downstream. Thus, optimum designs for overall aerosol filtering efficiency can be found in the vicinity of the aforementioned maximum hydraulic radii count values. However, allowance for variation in application conditions (e.g., engine wear resulting in blow-by flow rate increases, solid or semi-solid contaminants becoming captured by the filtering medium that further restricts flow through the media, etc.) suggest that optimum values of hydraulic radii count may be less than the maximum values listed above. While designs with filter media having significantly lower hydraulic radii count values, such as 10, will almost certainly result in positive recirculation, their overall aerosol filtering efficiencies are not as high as those optimized according to the above-described methodologies. Thus, for certain products that are designed primarily for the objective of highest efficiency, a range of suitable values for the $N_{hyd}$ can be defined. In many arrangements, preferential ranges of the parameter for annular non-pleated media elements include: 75-500 for 0-0.5 mm thick media, 100-700 for 0.5-1 mm thick media, 130-1000 for 1-2 mm thick media, 160-1300 for 2-4 mm thick media, 200-1800 for 4-8 mm thick media, 300-2200 for 8-15 mm thick media, 400-3000 for 15-30 mm thick media, and 600-4000 for >30 mm thick media. For annular pleated media elements, preferential ranges of values for $N_{hyd}$ include: 120-800 for media with 0-0.5 mm thickness, 140-950 for 0.5-1 mm thick media, 180-1400 for 1-2 mm thick media, 240-1700 for 2-4 mm thick media, and 300-2000 for 4-8 mm thick media, and somewhat larger values for media thicker than 8 mm. These ranges establish values where there exists an optimum tradeoff between: (a) the inefficiency of porous media due to small aerosol size, excessive size of pores or fibers, or excessive porosity and (b) the inefficiency of the rotating coalescing filter system overall due to potential bypass of flow, unfiltered through the dynamic clearance seal.

The relationships set forth in equations 5 and 6 are derived by considering the positive pumping pressure versus the negative pressure drop (dP) across the filter element as set forth below in equations 7 through 11. In equations 7-11, R corresponds to the radius of the noted diameter as defined above.

$$P_{rise} = \rho \cdot \frac{\omega^2}{2} \cdot \left( \left( \frac{D_3}{2} \right)^2 - \left( \frac{D_0}{2} \right)^2 \right) \tag{7}$$

$$\Delta P_{media} = \frac{\mu \cdot Q}{2 \cdot \pi \cdot h \cdot \kappa} \cdot \ln\left( \frac{D_2}{D_1} \right) \tag{8}$$

$$\frac{P_{rise}}{\Delta P_{media}} > 1 \tag{9}$$

$$\frac{\rho \cdot \frac{\omega^2}{8} \cdot (D_3^2 - D_0^2)}{\frac{\mu \cdot Q}{2 \cdot \pi \cdot h \cdot \kappa} \cdot \ln\left( \frac{D_2}{D_1} \right)} > 1, \text{ and by definition: } \frac{\mu}{\rho} = \upsilon \tag{10}$$

$$\frac{\pi \cdot \kappa \cdot \omega^2 \cdot h \cdot (D_3^2 - D_0^2)}{4 \cdot Q \cdot \nu \cdot \ln\left( \frac{D_2}{D_1} \right)} > 1 \tag{11}$$

Accordingly, the objective for annular media rotating CV systems is to maintain the relationship set forth above in equation 11.

Figure 5:
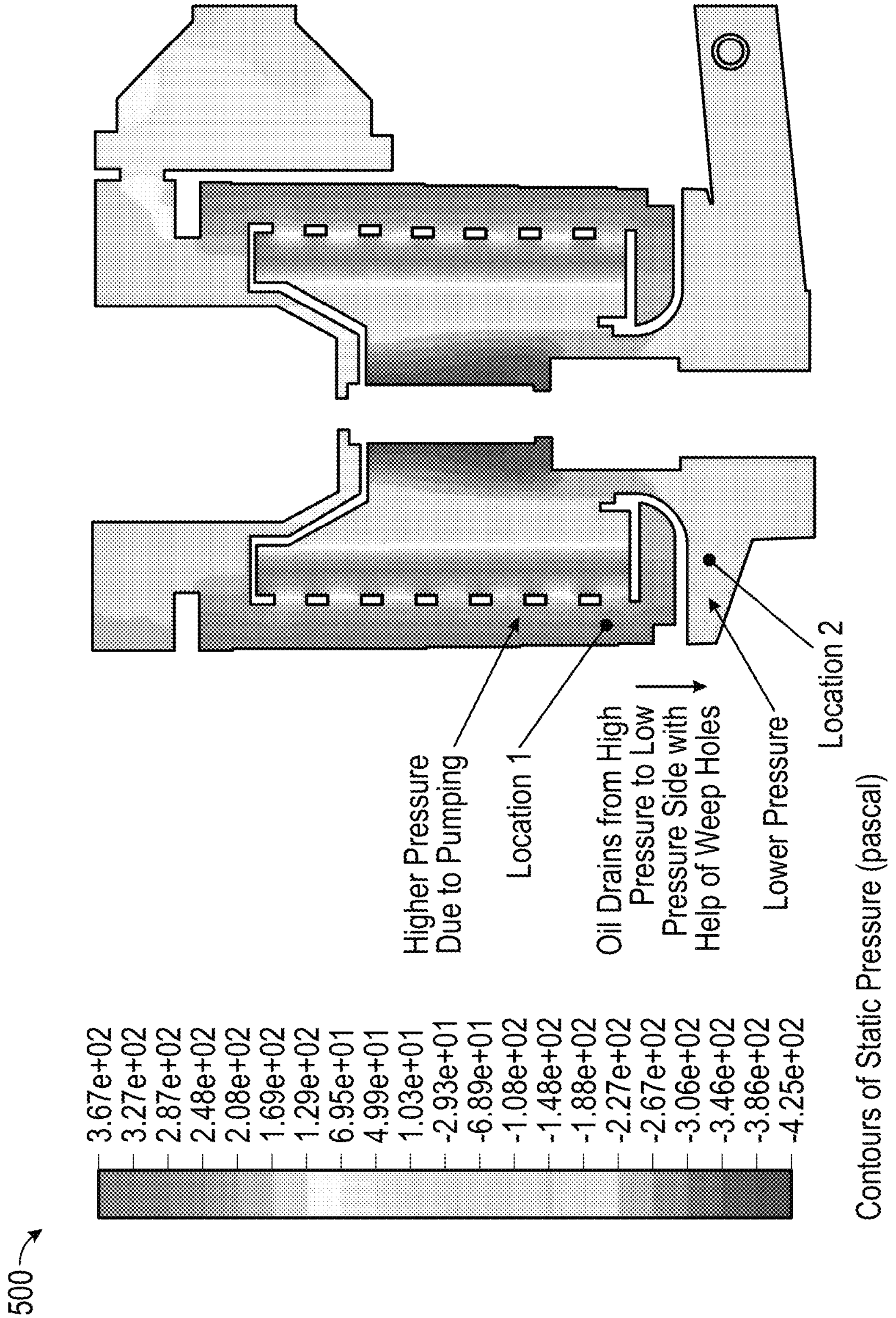
FIG. 5 is a computational fluid dynamics diagram of the CV system of FIG. 1.

Referring to FIG. 5, a computational fluid dynamics diagram 500 is shown of CV system 100. As shown in the diagram 500, a higher pressure (P2) exists at location 1 than the lower pressure (P1) at location 2. Location 1 is on the clean side of the filter media 114, and location 2 is on the dirty side of the filter media 114. The higher pressure at location 1 is caused by the pumping pressure of the rotating coalescer 108. Preferred values for the pressure ratio of P2:P1 are 0.8 to 5, depending on the depth and type of filter media utilized in the CV system 100. In addition to causing a positive recirculation effect within the CV system, the P2>P1 condition also provides the additional benefit of pushing the separated oil back to the crankcase. Accordingly, oil drains from the high pressure at location 1 to the low pressure of location 2. In some arrangements, the draining of the oil is facilitated through weep holes in the drain pan 126.

The above-described systems and methods are not limited to separating oil and aerosols from crankcase blowby gases. The same or similar arrangements and principles can be used in other filtration systems that utilize porous coalescer technology to separate liquid from a gas-liquid mixture.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The use of the term "approximately" in relation to numbers, values, and ranges thereof refers to plus or minus five percent of the stated of numbers, values, and ranges thereof.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments, and elements from different embodiments may be combined in a manner understood to one of ordinary skill in the art. Other substitutions, modifications, changes and omissions may also be made in the design, operating conditions and arrangement of the various example embodiments without departing from the scope of the present invention.

What is claimed is:

1. A crankcase ventilation system, comprising:

a housing;

an inlet configured to receive blowby gases and direct the blowby gases into the housing;

an outlet configured to direct filtered blowby gases out of the housing;

a rotating separating element positioned within the housing such that a gap exists between the rotating separating element and the housing, wherein the rotating separating element comprises a dirty side in communication with the blowby gases and a clean side in communication with the filtered blowby gases and separated oil from the blowby gases, wherein the gap permits gas flow between the clean side of the rotating separating element and the dirty side of the rotating separating element; and a central shaft coupled to the rotating separating element, the central shaft rotatable such that when the central shaft rotates, the rotating separating element rotates and creates a pumping pressure that causes higher pressure at the clean side of the rotating separating element and relative to the dirty side of the rotating separating element, thereby causing a positive recirculation of the blowby gases in which a portion of the filtered blowby gases from the clean side of the rotating separating element returns through the gap to the dirty side of the rotating separating element.

2. The crankcase ventilation system of claim 1, wherein the rotating separating element comprises a filter media comprising a fibrous media.

3. The crankcase ventilation system of claim 2, wherein the filter media is pleated.

4. The crankcase ventilation system of claim 3, wherein the filter media is selected such that $$\frac{\kappa \cdot N \cdot h \cdot \left(D_2^2 - 2D_1D_2\cos\left(\frac{\pi}{N}\right) + D_1^2\right)^{\frac{1}{2}} \cdot \omega^2 \cdot \left(D_3^2 - D_0^2\right)}{8 \cdot Q \cdot \upsilon \cdot t} > 1$$

is satisfied, where:

ω is a rotational speed of the rotating coalescer in rad/s, h is a media height of the filter media in m, t is a thickness of the filter media that is normal to a flow direction through the filter media in m, N is a number of pleats of the filter media, $D_0$ is an inside diameter of a rotating annul portion of the rotating coalescer, the rotating annul portion representing an outer diameter of the gap in m, $D_1$ is an inner diameter of the filter media in m, $D_2$ is an outer diameter of the filter media in m, $D_3$ is an outer diameter of the filter element in m, v is a kinematic viscosity of the blowby gases in $m^2/s$, Q is a flowrate of the blowby gases in $m^3/s$, and κ is a permeability of the filter media in $m^2$.

5. The crankcase ventilation system of claim 2, wherein the filter media is non-pleated.

6. The crankcase ventilation system of claim 5, wherein the filter media is selected such that $$\frac{\pi \cdot \kappa \cdot \omega^2 \cdot h \cdot \left(D_3^2 - D_0^2\right)}{4 \cdot Q \cdot \upsilon \cdot \ln\left(\frac{D_2}{D_1}\right)} > 1$$

is satisfied, where:

ω is a rotational speed of the rotating coalescer in rad/s, h is a media height of the filter media in m, $D_0$ is an inside diameter of a rotating annul portion of the rotating coalescer, the rotating annul portion representing an outer diameter of the gap in m, $D_1$ is an inner diameter of the filter media in m, $D_2$ is an outer diameter of the filter media in m, $D_3$ is an outer diameter of the filter element in m, v is a kinematic viscosity of the blowby gases in $m^2/s$, Q is a flowrate of the blowby gases in $m^3/s$, and κ is a permeability of the filter media in $m^2$.

7. The crankcase ventilation system of claim 2, further comprising a plurality of vanes disposed radially outwardly of the filter media.

8. The crankcase ventilation system of claim 7, wherein the plurality of vanes comprises radial ribs.

9. The crankcase ventilation system of claim 7, wherein the plurality of vanes comprises spiral vanes.

10. The crankcase ventilation system of claim 2, wherein the rotating separating element comprises a first endcap and a second endcap, the filter media positioned between the first endcap and the second endcap.

11. The crankcase ventilation system of claim 10, wherein the first endcap and the second endcap are secured to the central shaft.

12. The crankcase ventilation system of claim 2, wherein the filter media has a thickness of less than 0.0005 m.

13. The crankcase ventilation system of claim 2, wherein the filter media has a thickness of between 0.0005 and 0.001 m.

14. The crankcase ventilation system of claim 2, wherein the filter media has a thickness between 0.002 m and 0.004 m.

15. The crankcase ventilation system of claim 2, wherein the filter media has a thickness between 0.004 m and 0.008 m.

16. The crankcase ventilation system of claim 2, wherein the filter media has a thickness between 0.008 m and 0.015 m.

17. The crankcase ventilation system of claim 1, further comprising a pelton wheel coupled to the central shaft, wherein the central shaft is configured to be rotated by the pelton wheel as the pelton wheel is spun by a pressurized stream of fluid.

18. The crankcase ventilation system of claim 1, further comprising an electric motor configured to rotate the central shaft.

19. The crankcase ventilation system of claim 1, further comprising a chain drive system configured to rotate the central shaft.

20. The crankcase ventilation system of claim 1, further comprising a belt drive system configured to rotate the central shaft.

* * * * *